United States Patent [19]

Engelsmann et al.

[11] 3,719,126
[45] March 6, 1973

[54] PHOTOGRAPHIC APPARATUS FOR USE WITH PERCUSSIVE MULTILAMP PHOTOFLASH UNITS

[75] Inventors: Dieter Engelsmann, Unterhaching; Rolf Schroder, Munich, both of Germany

[73] Assignee: Agfa-Gevaert Aktiengesellschaft, Leverkusen, Germany

[22] Filed: July 28, 1971

[21] Appl. No.: 166,703

[30] Foreign Application Priority Data

July 30, 1970 Germany..................P 20 37 967.3

[52] U.S. Cl...................................95/11.5, 95/11 R
[51] Int. Cl.......................................................G03b
[58] Field of Search.................95/11 L, 11 R, 11.5 R; 240/1.3; 431/91, 92, 93

[56] References Cited

UNITED STATES PATENTS

| | | | |
|---|---|---|---|
| 3,576,155 | 4/1971 | Beach | 95/11.5 R |
| 3,602,618 | 8/1971 | Michatek | 95/11.5 R X |
| 3,576,156 | 4/1971 | Michatek | 95/11.5 R |
| 3,581,638 | 6/1971 | Colville et al. | 95/11.5 R |
| 3,584,551 | 6/1971 | Dierks et al. | 95/11.5 R X |
| 3,584,556 | 6/1971 | Harvey | 95/11.5 R |
| 3,602,120 | 8/1971 | Galbraith | 95/11.5 R |
| 3,552,286 | 6/1971 | Horton et al. | 95/11 L |
| 3,584,552 | 6/1971 | Montalto et al. | 95/11 L |

*Primary Examiner*—Samuel S. Matthews
*Assistant Examiner*—Kenneth C. Hutchison
*Attorney*—Michael S. Striker

[57] ABSTRACT

A photographic camera for use with indexible percussive multilamp photoflash units wherein the lamps can be fired in response to transmission of mechanical impacts to firing cartridges or the like. The camera body contains a three-armed driving lever which is pivotable from an uncocked to a cocked position whereby one of its arms receives motion from the film transporting and/or shutter cocking mechanism and another arm indexes the photoflash unit by way of a pawl. When the camera release is actuated to free the driving lever for movement to the uncocked position under the action of a spring, the third arm of the driving lever strikes against an impeller which causes the firing of a lamp, either directly or indirectly through the intermediary of a further impeller in the photoflash unit. The impeller is blocked in response to detachment of the photoflash unit from its socket in the camera body.

17 Claims, 3 Drawing Figures

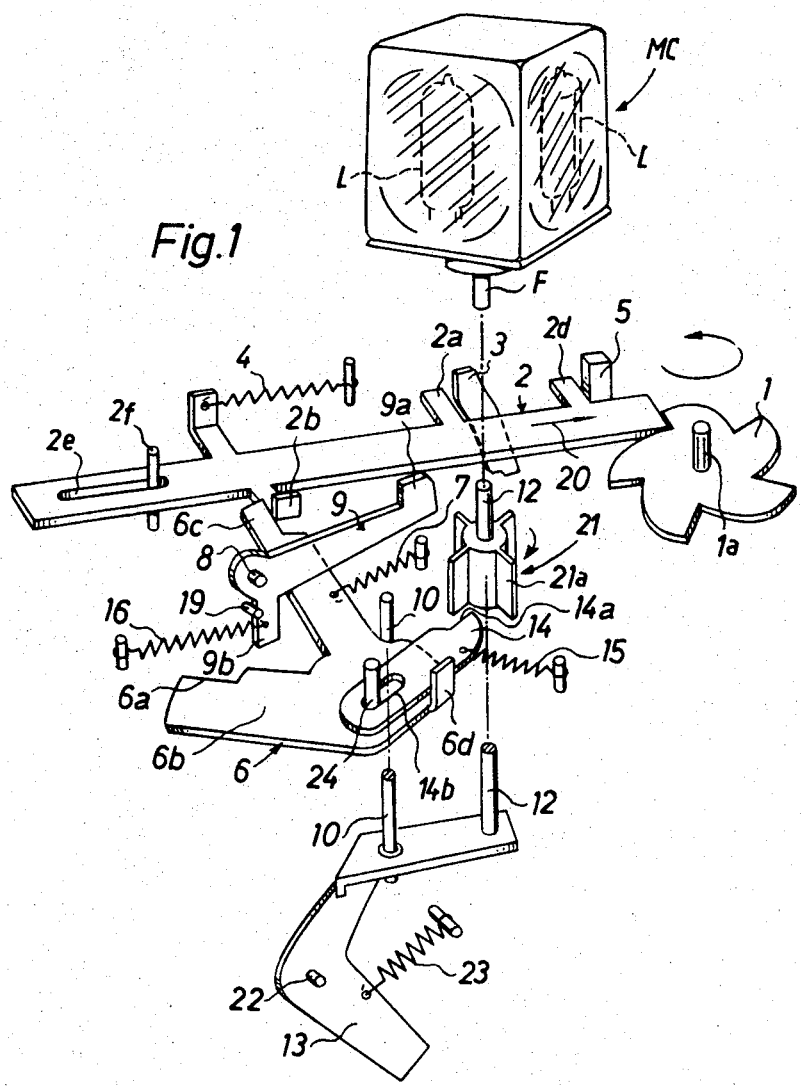

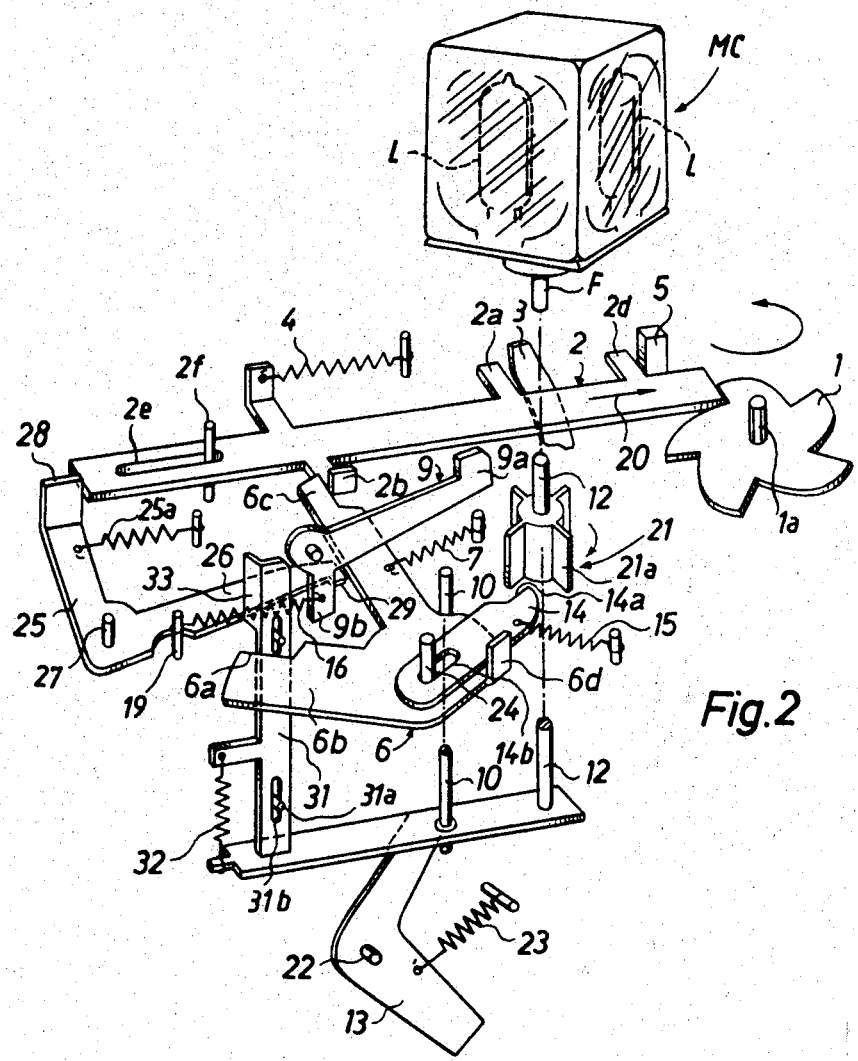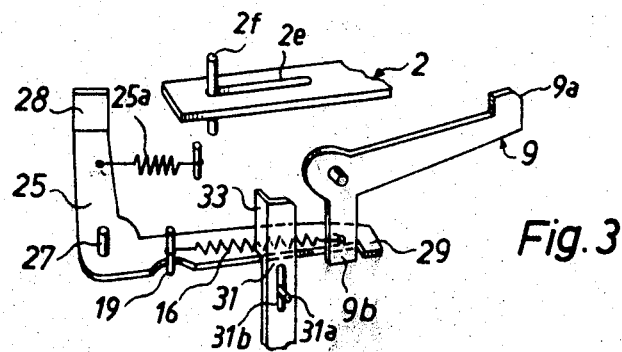

PHOTOGRAPHIC APPARATUS FOR USE WITH PERCUSSIVE MULTILAMP PHOTOFLASH UNITS

BACKGROUND OF THE INVENTION

The present invention relates to photographic apparatus in general, and more particularly to improvements in photographic apparatus (especially still cameras) which employ indexible holders for flash lamps. Still more particularly, the invention relates to improvements in photographic apparatus which are designed for use with percussive multilamp photoflash units of the type known as Magicubes (trademark), i.e., wherein the lamps can be fired in response to transmission of mechanical impacts to piezoelectric elements, cartridges or analogous lamp firing devices.

It is already known to provide a camera with an indexible socket which is designed to receive Magicubes or like multiple flash lamp holders of the type wherein a stressed actuating member is provided in the casing of the Magicube for each flash lamp. The housing of the camera accommodates means which can release the stressed actuating member for that flash lamp which faces the subject so that the thus released actuating member transmits a mechanical impulse to a firing device for the respective lamp.

A drawback of presently known cameras which are designed for use with Magicubes or analogous holders for impact-responsive light generating means is that the mechanism which causes the lamps to be fired and the means which causes the holder to change its angular position prior to each exposure are rather bulky, costly, complicated and comprise a substantial number of parts.

SUMMARY OF THE INVENTION

An object of the invention is to provide a photographic apparatus, particularly a still camera, with simple, compact, rugged and reliable means for the firing of impact-responsive light generating devices in indexible multilamp photoflash units of the type known as Magicubes.

Another object of the invention is to provide a still camera with a novel and improved indexing mechanism for impact-responsive sources of artificial light and to construct such indexing mechanism in such a way that its design need not excessively deviate from the design of popular indexing mechanisms for conventional indexible holders known as flashcubes.

A further object of the invention is to provide a photographic camera with means for firing indexible flash lamp holders of the type which need not be equipped with batteries and which embodies novel, improved and reliable means for indexing and for firing impact-responsive firing means for flash lamps or the like.

An additional object of the invention is to provide the photographic apparatus with novel means for preventing accidental firing of one or more flash lamps during attachment or detachment of a holder for such lamps from the housing of the apparatus.

Still another object of the invention is to provide a photographic apparatus wherein the shutter is automatically set for an optimum exposure time when a holder for impact-responsive firing devices for flash lamps is properly attached to the body of the apparatus.

The invention is embodied in a photographic apparatus, preferably in a still camera, which comprises an indexible source of artificial light having a predetermined number (e.g., four) impact-responsive flash lamps or analogous light generating means, a driving device which is movable between cocked and uncocked positions and serves to index (either directly or indirectly) the source in response to its movement to the cocked position, biasing means for urging the driving device to its uncocked position, means (preferably the camera release) for releasably holding the driving device in the cocked position, impeller means which is operable to transmit (either directly or indirectly) impacts to the light generating means in response to movement of the driving device from the cocked to the uncocked position, and cocking means (which may form part of or constitutes the film transporting and/or shutter cocking mechanism) for moving the driving device from the uncocked to the cocked position, preferably simultaneously with the transport of film and/or the cocking of the shutter.

The driving device is preferably pivotable between its cocked and uncocked positions.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of a portion of a photographic apparatus which embodies one form of the invention;

FIG. 2 is a similar perspective view of a portion of a modified photographic apparatus; and FIG. 3 is a perspective view of a detail in the structure of FIG. 2 but showing certain parts in different positions.

DESCRIPTION OF THE PREFERRED EMBODIMENTS

Referring first to FIG. 1, there is shown a portion of a still camera which includes a toothed wheel 1 constituting one element of a film transporting mechanism and being rotatable by hand in a counterclockwise direction (as indicated by the arrow) to thereby rotate the shaft 1a of a takeup reel (not shown) for roll film. The wheel 1 transmits motion to a reciprocable shutter cocking element or slide 2 which also serves as a means for preventing double exposure of film frames. In the illustrated left-hand end position the slide 2 stresses a return spring 4 and is ready to actuate a shutter blade 3 by moving such blade from its closed position. The slide 2 is held in the illustrated position by a depressible release member 5; when the latter is depressed, the slide 2 can or is caused to bypass the adjacent tooth of the wheel 1 and advances in the direction indicated by the arrow 20 under the action of the spring 4. A projection 2a of the slide 2 moves over and beyond the illustrated portion of the shutter blade 3 in response to rotation of the wheel 1 in the counterclockwise direction.

The wheel 1 and the slide 2 together constitute a cocking means for a driving device 6 here shown as a three-armed lever which is pivotable about the axis of a vertical shaft 24 mounted in the camera body.

The source of artificial light comprises a socket 21 which is mounted in the body of the camera and is indexible about the axis of an elongated vertical shaft 12, always through 90° and in a clockwise direction, as viewed in FIG. 1. The socket 21 constitutes a first part of the light source which further comprises a second part in the form of a Magicube MC which is a multiple flash lamp holder that can be attached to and separated from the socket 21 in a manner well known from the art of conventional flashcubes. A foot F of the Magicube MC depresses the shaft 12 in response to attachment of Magicube to the socket 21 whereby the shaft 12 pivots an adjusting lever 13 which is fulcrumed in the camera body, as at 22, and is biased by a helical spring 23 which tends to maintain the shaft 12 in the illustrated raised or upper end position. The lever 13 serves to automatically adjust the shutter (including the blade 3) so as to furnish an optimum exposure time for the making of exposures with artificial illumination of the subject. For example, the lever 13 can adjust the shutter to furnish an exposure time of 1/30 or 1/60 second when the Magicube MC is properly coupled to the socket 21 so that the lever 13 is pivoted in a clockwise direction and stresses the spring 23.

The adjusting lever 13 for the shutter is operatively connected with and can transmit motion to a vertically reciprocable elongated blocking member or stop 10 shown in an operative position in which it extends into the path of movement of the driving device 6 because the Magicube MC is detached from the socket 21 so that the spring 23 is free to maintain the shaft 12 in the upper end position through the intermediary of the adjusting lever 13. The connection between the adjusting lever 13 and the components 10, 12 is shown schematically; it is clear that such connection allows for pivotal movements of the lever 13 while the components 10, 12 move up or down. The stop 10 prevents unnecessary pivotal movements of the driving device 6 and impeller 9 when the magicube MC is detached from the socket 21.

The driving device 6 is biased in a clockwise direction, as viewed in FIG. 1, by a helical spring 7 which is attached to a stationary post in the camera body. This driving device 6 has three portions or arms 6b, 6c, 6d. The arm 6c receives motion from a projection 2b of the slide 2 so that the driving device 6 is automatically moved to the illustrated cocked position when the slide 2 is moved by the adjacent tooth of the wheel 1 to advance in a direction to the left, i.e., against the opposition of the spring 4. Once a further projection 2d moves beyond and is thereupon retained by the release member 5, the projection 2b maintains the driving device 6 in the cocked position by extending into the path of movement of the arm 6c. It will be seen that the release member 5 constitutes a means for releasably holding the slide 2 in the illustrated left-hand end position as well as for releasably maintaining the driving device 6 in the cocked position. If the Magicube MC is detached from the socket 21, the spring 7 cannot pivot the driving device 6 to its uncocked position because the blocking member or stop 10 extends into the path of movement of the arm 6c. However, if the Magicube MC is properly attached to the socket 21 so that the shaft 12 is depressed and the upper end portion of the stop 10 is located at a level below the plane of the driving device 6, the spring 7 can contract as soon as the release member 5 frees the slide 2 for movement under the action of the spring 4. The driving device 6 is arrested in the uncocked position by the projection 2b of the slide 2. The latter has an elongated slot 2e which receives a fixedly mounted pivot pin 2f serving to permit pivotal as well as reciprocatory movements of the slide 2. The pivotal movements are necessary in order to move the right-hand end portion of the slide into and from engagement with the teeth of the wheel 1. The length of the slot 2e determines the extent of reciprocatory movement of the slide 2.

During pivotal movement of the driving device 6 under the action of the spring 7, an edge face 6a of the arm 6b strikes against the downwardly extending arm 9b of an impeller 9 which is pivotable in the camera body about the axis of a horizontal shaft 8 and is biased by a helical spring 16 so that its arm 9b normally bears against a stationary abutment 19. The longer arm of the impeller 9 has a head 9a which strikes against an impact-responsive firing cartridge (not specifically shown) in the Magicube MC and causes the generation of artificial light by the associated flash lamp L. The head 9a will strike against the adjacent firing cartridge in the Magicube MC when the latter is properly attached to the socket 21 (so that it can be indexed with the socket) and when the user of the camera actuates the release member 5 to free the slide 2 to the action of the spring 4 and to thus enable the spring 7 to propel the driving device 6 from the illustrated cocked position to the uncocked position. During such pivotal movement of the driving device 6, the edge face 6a of the arm 6b strikes with a requisite force against the arm 9b to move this arm away from the abutment 19 and to stress the spring 16. The exact manner in which the head 9a of the impeller 9 can cause a lamp L in the Magicube MC to furnish artificial light in response to movement of the driving device 6 to its uncocked position forms no part of the present invention. Instead of directly striking a firing device in the Magicube MC, the head 9a of the impeller 9 can be used as a means for disengaging a prestressed impeller in the casing of the magicube from a suitable stop so that the impeller in the Magicube then strikes against a cartridge or a piezoelectric element and causes the firing of that flash lamp L which faces the subject.

When an exposure is completed in response to depression of the release member 5, the next exposure can be made only upon rotation of the wheel 1 to thereby advance the film by the length of a frame and to simultaneously cock the shutter by way of the slide 2. At the same time, the projection 2b of the slide 2 returns the driving device 6 to the illustrated cocked position in which the spring 7 is stressed and is ready to propel the edge face 6a of the arm 6b against the arm 9b of the impeller 9. The latter returns to the illustrated normal position under the action of the spring 16 so that its arm 9b invariably bears against the abutment 19 when the driving device 6 dwells in the cocked position.

The arm 6d of the driving device 6 serves to pivot a motion transmitting pawl 14 which is turnable on the shaft 24 and is biased against the arm 6d by a spring 15. The pallet 14a of the motion transmitting pawl 14 engages the adjacent wing 21a of the socket 21 and indexes the socket in a clockwise direction through 90° in response to movement of the driving device 6 from the uncocked to the cocked position. As shown in FIG. 1, the pawl 14 is mounted on the shaft 24 with limited freedom of lengthwise movement. (see the slot 14b).

If the Magicube MC is detached from the socket 21 while the driving device 6 dwells in the uncocked position, the upper end portion of the blocking member or stop 10 bears against the underside of the driving device under the action of the spring 23 and returns to the illustrated operative position only after or shortly before the driving device 6 reassumes the illustrated cocked position. If the release member 5 is actuated while the Magicube MC is detached from the socket 21, the slide 2 is free to move in the direction indicated by the arrow 20 and to open the shutter by striking with its projection 2a against the blade 3 but the driving device 6 remains in the cocked position because the stop 10 extends into the path of movement of the arm 6c. Consequently, the socket 21 is not indexed when the slide 2 is thereupon returned to the illustrated position in response to anticlockwise rotation of the wheel 1 because the driving device 6 is at a standstill. The arm 6c is freed to enable the driving device 6 to follow the bias of the spring 7 as soon as the Magicube MC or a Magicube with four fresh flash lamps L is properly attached to the socket 21.

The socket 21 is indexible only in a clockwise direction, as viewed in FIG. 1. The slot 14b in the motion transmitting pawl 14 is provided for the purpose of enabling the pallet 14a to bypass the adjacent wing 21a of the socket 21 while the driving device 6 moves to its uncocked position under the action of the spring 7. The same wing 21a is thereupon engaged by the pallet 14a during return movement of the device 6 to its uncocked position so that the pallet 14a automatically indexes the socket 21 through 90°.

FIG. 2 illustrates a portion of a modified still camera wherein all such components which are identical with or clearly analogous to the corresponding components of the camera shown in FIG. 1 are denoted by similar reference characters. The structure of FIG. 2 further comprises an arresting lever 25 which is pivotable in the camera body about the axis of a vertical shaft 27 and has two arms one of which is biased in a clockwise direction by a helical spring 25a. The spring 25a biases an upwardly extending portion 28 of the arresting lever 25 against the left-hand end face of the slide 2.

A tooth 29 of the arresting lever 25 can engage or move into the path of the arm 9b on the impeller 9 to hold the latter in the starting or inoperative position when the slide 2 assumes the right-hand end position shown in FIG. 2. When the wheel 1 is thereupon rotated in a counterclockwise direction to advance the film by the length of a frame and to simultaneously return the slide 2 to the left-hand end position of FIG. 2 (corresponding to that shown in FIG. 1), the slide 2 pivots the arresting lever 25 by way of the upwardly extending portion 28 and moves the tooth 29 out of the path of the arm 9b on the impeller 9. Thus, the latter is then free to pivot in a counterclockwise direction in response to pivotal movement of the driving device 6 from its cocked position. It will be noted that the tooth 29 invariably prevents the pivoting of the impeller 9 from its starting position when the slide 2 dwells in the right-hand end position. This prevents the impeller 9 from accidentally firing a flash lamp L during attachment or detachment of a Magicube and while the driving device 6 dwells in the uncocked position.

When the components of the camera assume the positions shown in FIG. 2, the Magicube is assumed to be detached from the socket 21 because the blocking member or stop 10 is shown in the operative position in which it extends into the path of movement of the arm 6c. If the Magicube is thereupon attached to the socket 21, the shaft 12 causes the adjusting lever 13 to move against the opposition of the spring 23 and to move the upper end portion of the stop 10 to a level below the plane of the driving device 6. The stop 10 thus prevents accidental firing of a flash lamp L during attachment of a Magicube to the socket 21. In order to enable the camera to make an exposure with artificial illumination of the subject, the slide 2 must be shifted by the wheel 1 from the position of FIG. 3 (in which the tooth 29 of the arresting lever 25 engages the arm 9b of the impeller 9) to the position of FIG. 2 whereby the slide 2 engages the portion 28 and disengages the tooth 29 from the arm 9b. The exposure is made by actuating the release member 5 so as to allow the spring 4 to contract and to move the slide 2 back to the position of FIG. 3. The slide 2 opens the shutter and the spring 7 propels the driving device 6 from the cocked position of FIG. 2 to the uncocked position so that the arm 6b propels the impeller 9 from the starting position and the latter initiates the firing of a flash lamp L. The slide 2 can engage the portion 28 to disengage the arresting lever 25 from the impeller 9 immediately before the projection 2b returns the driving device 6 to the cocked position of FIG. 2 by way of the arm 6c.

The embodiment of FIGS. 2 and 3 further includes a disengaging member 31. The latter resembles a slide and is guided by stationary pins 31a extending into aligned vertical slots 31b. A helical spring 32 biases the lower end face of the disengaging member 31 against the adjusting lever 13 (or against a platform which is movable by the adjusting lever 13 in response to dissipation of energy by the spring 23 or by the shaft 12 in response to attachment of a Magicube to the socket 21. When a Magicube is attached to the socket 21 while the components of the camera assume the positions shown in FIG. 2, the shaft 12 causes the stop 10 to move downwardly and such downward movement of the stop 10 is shared by the disengaging member 31 under the action of the spring 32. A flange 33 of the disengaging member 31 then engages the right-hand arm of the arresting lever 25 and pivots the tooth 29 away from engagement with the arm 9b of the impeller 9 or prevents the arresting lever 25 from following the bias of the spring 25a to such an extent that its tooth 29 could extend into the path of movement of the arm 9b. The flange 33 serves as a safety feature to prevent the tooth 29 from moving into the path of the arm 9b during movement of the slide 2 from the position of FIG. 2 to the position of FIG. 3; however, the flange 33 can perform such function only when the Magicube is properly attached to the socket 21 so that the disengaging member 31 dwells in the lower end position in which its flange 33 extends into the path of movement of the right-hand arm of the arresting lever 25. Thus, the impeller 9 is then free to initiate the firing of a flash lamp L in the properly attached Magicube as soon as it receives an impulse from the edge face 6a on the arm 6b of the driving device 6. When a Magicube is attached to the socket 21 while the arresting lever 25 and the slide 2 assume the positions shown in FIG. 3, the disengaging member 31 is caused to move downwardly under the action of the spring 32 and pivots the arresting lever 25 in a counterclockwise direction so as to disengage the tooth 29 from the arm 9b of the impeller 9. The spring 23 lifts the disengaging member 31 back to the position of FIG. 3 in which the flange 33 cannot interfere with the movement of the tooth 29 into engagement with the arm 9b as soon as the user decides to detach the Magicube from the socket 21.

The improved photographic apparatus is susceptible of many additional modifications which will be readily understood with reference to FIGS. 1 and 2. For example, the socket 21 can be fixedly mounted in the body of the photographic apparatus and the Magicube MC can be provided with wings or like motion receiving parts which can be engaged by the pallet 14a to index a properly attached Magicube while the driving device 6 is caused to return from the uncocked position to the cocked position of FIGS. 1 or 2. Furthermore, the upper end portion of the stop 10 can be provided with a suitably inclined cam face (not shown) which is engaged by the driving device 6 during movement from the uncocked to the cocked position to depress the stop 10 if the Magicube is detached from the socket 21 (or a fixedly mounted socket) while the device 6 dwells in the uncocked position. Such inclined cam face enables the driving device 6 to reassume the cocked position even if the stop 10 extends upwardly along and beyond the left-hand edge face of the arm 6c in the uncocked position of the driving device.

It is further clear that at least some of the pivotable components of the apparatus shown in FIGS. 1 and 2 can be replaced with reciprocable components or vice versa. The stop 10 can be mounted in such a way that, when the Magicube is detached from the socket 21, the stop extends into the path of movement of the driving device 6 and/or into the path of movement of the impeller 9.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, a combination comprising an indexible source of artificial light having impact-responsive light generating means; a driving device movable between cocked and uncocked positions; means movable with said driving device to index said source in response to movement of said driving device to said cocked position; biasing means for urging said driving device to said uncocked position; means for releasably holding said driving device in said cocked position; impeller means operable to transmit impacts to said light generating means in response to reception of an impulse from said driving device during movement of said driving device from said cocked to said uncocked position thereof; and cocking means for moving said driving device from said uncocked to said cocked position.

2. A combination as defined in claim 1, wherein said cocking means comprises a film transporting mechanism arranged to transport the film simultaneously with the movement of said driving device to said cocked position.

3. A combination as defined in claim 1, further comprising shutter means movable between said cocked and uncocked positions, said cocking means comprising means for moving said shutter means to said cocked position simultaneously with the movement of said driving device to said cocked position thereof.

4. A combination as defined in claim 1, further comprising shutter means, said means for releasably holding said driving device in said cocked position comprising a release member which is operable to release said driving device to the action of said biasing means and to effect the actuation of said shutter means.

5. A combination as defined in claim 1, wherein said movable means is interposed between said source and said driving device to bodily engage and index said source in response to movement of said driving device from said uncocked to said cocked position thereof.

6. A combination as defined in claim 1, wherein said driving device is pivotable between said cocked and uncocked positions and comprises a first portion which receives motion from said cocking means, a second portion which transmits motion to said impeller means, and a third portion which effects the indexing of said source.

7. A combination as defined in claim 6, wherein said movable means receives motion from said third portion of said driving device during movement of said driving device to said cocked position to thereby directly engage and index said source, and further comprising means for biasing said motion transmitting means against said third portion of said driving device.

8. A combination as defined in claim 1, wherein said source comprises a first part and a second part separable from and attachable to said first part, and blocking means movable from an inoperative position to an operative position in response to separation of said second part from said first part to thereby prevent the operation of said impeller means.

9. A combination as defined in claim 8, wherein, in said operative position thereof, said blocking means extends into the path of movement of said driving device from said cocked to said uncocked position thereof.

10. A combination as defined in claim 8, wherein said impeller means is operable by said driving device to move from a first to a second position and wherein said blocking means, in said operative position thereof, extends into the path of movement of said impeller means from said first to said second position.

11. A combination as defined in claim 8, further comprising shutter means adjustable to furnish a plurality of exposure times and mobile adjusting means for adjusting said shutter means so that the latter furnishes a predetermined exposure time in response to attachment of said second part of said source to said first part, said blocking means receiving motion from said adjusting means.

12. A combination as defined in claim 11, wherein said blocking means comprises an elongated stop provided on said adjusting means.

13. A combination as defined in claim 12, wherein said adjusting means comprises an elongated member which is at least substantially parallel with said stop and is moved from a first to a second position in response to attachment of said second part of said source to said first part to thereby move said stop from said operative to said inoperative position.

14. A combination as defined in claim 13, further comprising means for biasing said elongated member to said first position in which said elongated member maintains said stop in said operative position.

15. A combination as defined in claim 1, further comprising arresting means for holding said impeller means against movement during movement of said driving device from said uncocked to said cocked position thereof, said cocking means including a portion arranged to disengage said arresting means from said impeller means not later than upon completion of movement of said driving device to said cocked position.

16. A combination as defined in claim 15, wherein said source comprises a first part and a second part which is separable from and attachable to said first part, and further comprising disengaging means movable from an operative position in which said disengaging means disengages said arresting means from said impeller means to an inoperative position in response to detachment of said second part to said first part.

17. A combination as defined in claim 16, further comprising blocking means which extends, in the operative position of said disengaging means, into the path of movement of said driving device from said cocked position.

* * * * *